United States Patent Office.

H. H. ETTER, OF WASHINGTON, DISTRICT OF COLUMBIA.

Letters Patent No. 63,027, dated March 19, 1866.

---

IMPROVED BURNING FLUID.

---

*The Schedule referred to in these Letters Patent and making part of the same.*

---

TO ALL WHOM IT MAY CONCERN:

Be it known that I, H. H. ETTER, of the city of Washington, and District of Columbia, have invented a new and useful Improved Burning Fluid; and I do hereby declare the following to be an exact description thereof.

The nature of my invention is the use of ingredients, added to naphtha and other burning oils, to give a body to the oil or prepared fluid that makes the fluid burn with a more brilliant flame, burns longer, does not flare up through the chimney, as the common coal oil, but burns with a more steady light, and not liable to explode, and much safer for use.

I mix the ingredients and make my burning fluid as follows:

To forty gallons of naphtha (of gravity from 62 to 65) I add two quarts of oil of vitriol, three half pints of linseed oil. These ingredients are put into a barrel with the naphtha, and shaken well together, and left to settle for eight days. I then rack it off into another coal-oil barrel, and add the following ingredients in the following proportions: First draw off five gallons of the naphtha into another vessel, and mix with it two pounds of white-oak bark, ground, and a half pound of hemlock bark ground, and one and a half pound of slippery-elm bark, also ground, and one pound of sassafras bark of the roots, (to destroy the smell of the benzine,) letting this mixture remain for ten hours and stirring it frequently, then straining the whole through a cloth, and add it to the barrel of naphtha, and in twenty-four hours it is ready for use.

What I claim as my invention, and desire to secure by Letters Patent, is—

The ingredients, when mixed in the proportions as herein specified, for the purpose of producing a safe and brilliant light.

H. H. ETTER.

Witnesses:
    J. FRANKLIN REIGART,
    LERY DILLERBERG.